United States Patent

Nogata et al.

[11] Patent Number: 5,816,697
[45] Date of Patent: Oct. 6, 1998

[54] VISCOUS LIQUID STIRRING DEVICE AND A PROCESS FOR PRODUCING POLYCARBONATE BY USING THE STIRRING DEVICE

[75] Inventors: Tomoaki Nogata; Masashi Shimonaru; Toru Sawaki; Takeshi Muraoka, all of Iwakuni, Japan

[73] Assignee: Teijin Limited, Osaka, Japan

[21] Appl. No.: 754,194

[22] Filed: Nov. 27, 1996

[30] Foreign Application Priority Data

Dec. 5, 1995 [JP] Japan ................................ 7-316469
Dec. 6, 1995 [JP] Japan ................................ 7-317944
Jul. 12, 1996 [JP] Japan ................................ 8-183178

[51] Int. Cl.⁶ .................................................. B29B 7/24
[52] U.S. Cl. ........................................ 366/76.1; 366/297
[58] Field of Search ................. 366/97, 297, 301, 366/310, 315, 325.4, 325.92, 168.1, 139, 76.1

[56] References Cited

U.S. PATENT DOCUMENTS

| | | | |
|---|---|---|---|
| 2,814,472 | 11/1957 | Erdmenger | 366/301 |
| 2,904,401 | 9/1959 | Booth | 366/301 |
| 3,049,750 | 8/1962 | Austin | 366/168.1 |
| 3,446,485 | 5/1969 | Fischer | 366/301 |
| 3,719,350 | 3/1973 | Loomans . | |
| 4,074,864 | 2/1978 | Narita et al. . | |
| 4,352,568 | 10/1982 | Lohr et al. | 366/297 |
| 4,474,473 | 10/1984 | Higuchi et al. | 366/301 |
| 4,514,090 | 4/1985 | Neubauer et al. . | |
| 4,773,654 | 9/1988 | Fritsch . | |
| 4,776,703 | 10/1988 | Oda et al. | 366/301 |

FOREIGN PATENT DOCUMENTS

| | | |
|---|---|---|
| 0249251 | 12/1987 | European Pat. Off. . |
| 0330308 | 8/1989 | European Pat. Off. . |
| 1059944 | 10/1952 | Germany ........................... 366/301 |
| 51-40652 | 11/1976 | Japan . |
| 61-59173 | 12/1986 | Japan . |
| 62-180746 | 8/1987 | Japan . |
| 62-252402 | 11/1987 | Japan . |
| 63-117038 | 5/1988 | Japan . |
| 4-235727 | 8/1992 | Japan . |
| 6-18618 | 3/1994 | Japan . |

*Primary Examiner*—Tony G. Shoohoo
*Attorney, Agent, or Firm*—Sughue Mion, Zinn, Macpeak & Seas, PLLC

[57] ABSTRACT

A viscous liquid stirring device comprising a first rotary shaft and a second rotary shaft which are arranged in parallel to each other in the horizontal plane in the vessel. The rotary shafts have a plurality of rotors thereon and are rotated at the same speed and in the same direction that the upper face of the first rotary shaft moves away from the second rotary shaft. A viscous liquid inlet portion is formed on the top portion of the inner wall of the end plate of the vessel.

20 Claims, 9 Drawing Sheets

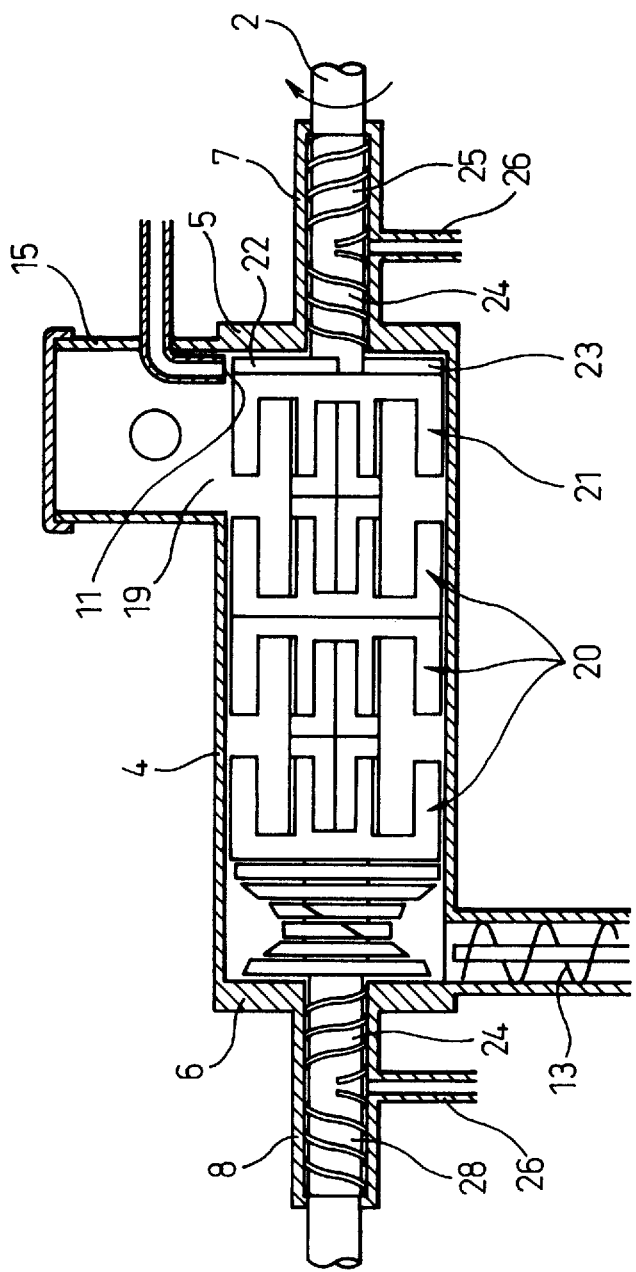

VISCOUS LIQUID STIRRING DEVICE AND A PROCESS FOR PRODUCING POLYCARBONATE BY USING THE STIRRING DEVICE

BACKGROUND OF THE INVENTION

1. Field of the Invention

The present invention relates to a viscous liquid stirring device and a process for producing polycarbonate by using the stirring device.

2. Description of the Related Art

Various types of viscous liquid stirring devices have been proposed to produce a synthetic polymer by a molten polymerizing process. In these stirring devices, if a viscous liquid stagnates at a particular place in the stirring device, for example, on the inner wall of the stirring device, the viscous liquid receives a large amount of head from the surroundings, and as a result, the viscous liquid deteriorates. Particularly in the stirring device for producing an aromatic polycarbonate which is often used for the optical elements, if the viscous liquid deteriorates in the stirring device, the quality of the polycarbonate greatly decreases.

Accordingly, to obtain a synthetic polymer having a high quality, it is necessary to prevent a viscous liquid from stagnating at a particular place in the stirring device, i.e., make a viscous liquid continue to flow within the stirring device. If a viscous liquid continues to flow, the interior of the stirring device is cleaned by the viscous liquid, and thus, it is possible to prevent the viscous liquid from deteriorating in the stirring device. This cleaning operation by the viscous liquid is called a self-cleaning function.

In a known stirring device having a self-cleaning function, a pair of spaced rotary shafts extending in parallel to each other in a horizontal plane are arranged in a vessel, and each of the rotary shaft has thereon a plurality of axially spaced rotors having a spindle-shaped contour. Each rotor rotates while keeping a slight distance from both the inner wall of the vessel and the aligned rotor mounted on the other rotary shaft so that a viscous liquid does not continue to adhere onto the inner wall of the vessel and the walls of the rotors. A viscous liquid inlet port is formed on the upper wall of the vessel at a position located centrally between the rotary shafts, and a viscous liquid outlet port is formed on the bottom wall of the vessel at a position remote from the viscous liquid inlet port. A viscous liquid fed into the vessel moves toward the viscous liquid outlet port while being stirred by the rotors (see Japanese Unexamined Patent Publication No. 4-235727).

However, where the viscous liquid inlet port is arranged centrally between the rotary shafts as in the above-mentioned stirring device, a sufficient amount of a viscous liquid is not fed to the rotors mounted on one of the rotary shafts and positioned near the viscous liquid inlet port, as described later in detail. As a result, since a sufficient self-cleaning function is not created for all the rotors, the viscous liquid will easily deteriorate. Therefore, in this stirring device, it is necessary to shorten time intervals of the cleaning operation of the stirring device to maintain the high quality of the synthetic polymer, resulting in an increase in the operation cost of the stirring device.

SUMMARY OF THE INVENTION

An object of the present invention is to provide a viscous liquid stirring device capable of continuously operating for a long time to maintain the high quality of the production.

Another object of the present invention is to provide a process for producing a polycarbonate having a high quality by using the stirring device according to the present invention.

According to the first aspect of the present invention, there is provided a device for stirring a viscous liquid comprising: a vessel having a substantially horizontally extending shell which has a cocoon shaped cross section, an inlet side end plate arranged at one end thereof, and an outlet side end plate arranged at other end thereof; a first rotary shaft extending in a substantially horizontal plane in the vessel and having a plurality of rotors thereon; a second rotary shaft extending in parallel to the first rotary shaft in the substantially horizontal plane in the vessel and having thereon a plurality of rotors which cooperate with the rotors of the first rotary shaft to stir a viscous liquid, the first rotary shaft and the second rotary shaft being rotated in the same direction that an upper face of the first rotary shaft moves away from the second rotary shaft; a viscous liquid inlet port arranged in an upper portion of the vessel above the first rotary shaft at an inlet side end portion of the vessel; and a viscous liquid out let port arranged at an outlet side end portion of the vessel.

According to the second aspect of the present invention, there is provided a process for producing polycarbonate by using the stirring device according to the present invention, the process comprising the steps of: feeding polycarbonate, which is obtained by molten polymerizing an aromatic dihydrox compound and a carbonic diester, into the vessel; and molten stirring the polycarbonate under a vacuum pressure in the vessel to further molten polymerize the polycarbonate.

The present invention may be more fully understood from the description of preferred embodiments of the invention set forth below, together with the accompanying drawings.

BRIEF DESCRIPTION OF THE DRAWINGS

In the drawings:

FIG. 7 is a cross-sectional view of an alternative embodiment of the stirring device;

DESCRIPTION OF PREFERRED EMBODIMENTS

Figure 1:
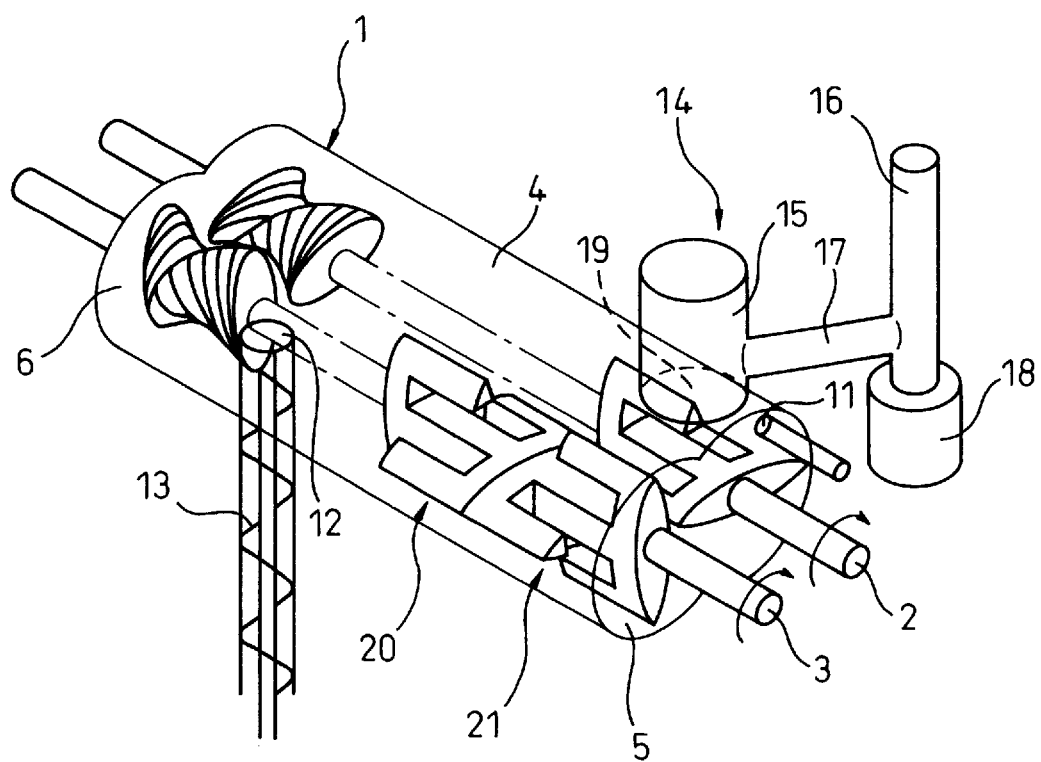
FIG. 1 is a schematically illustrated perspective view of a stirring device.

Referring to FIGS. 1 through 4, reference numeral 1 designates a vessel of a stirring device, 2 a first rotary shaft, and 3 a second rotary shaft. The vessel 1 comprises a shell 4 surrounding the rotary shafts 2 and 3, and a pair of end plates 4 and 5 arranged at the opposed ends of the shell 4 and having a flat inner wall. The shell 4 has a cocoon shaped cross-section formed by connecting side walls of cylindrical members, and the rotary shafts 2 and 3 are arranged on axes of these corresponding cylinders. The rotary shafts 2 and 3 extend in parallel to each other substantially in a horizontal plane and are caused to rotate in the same direction illustrated by the arrows in FIGS. 1 through 4. In addition, in the embodiment illustrated in FIGS. 1 through 4, the rotary shafts 2 and 3 are caused to rotate at the same speed.

Figure 2:
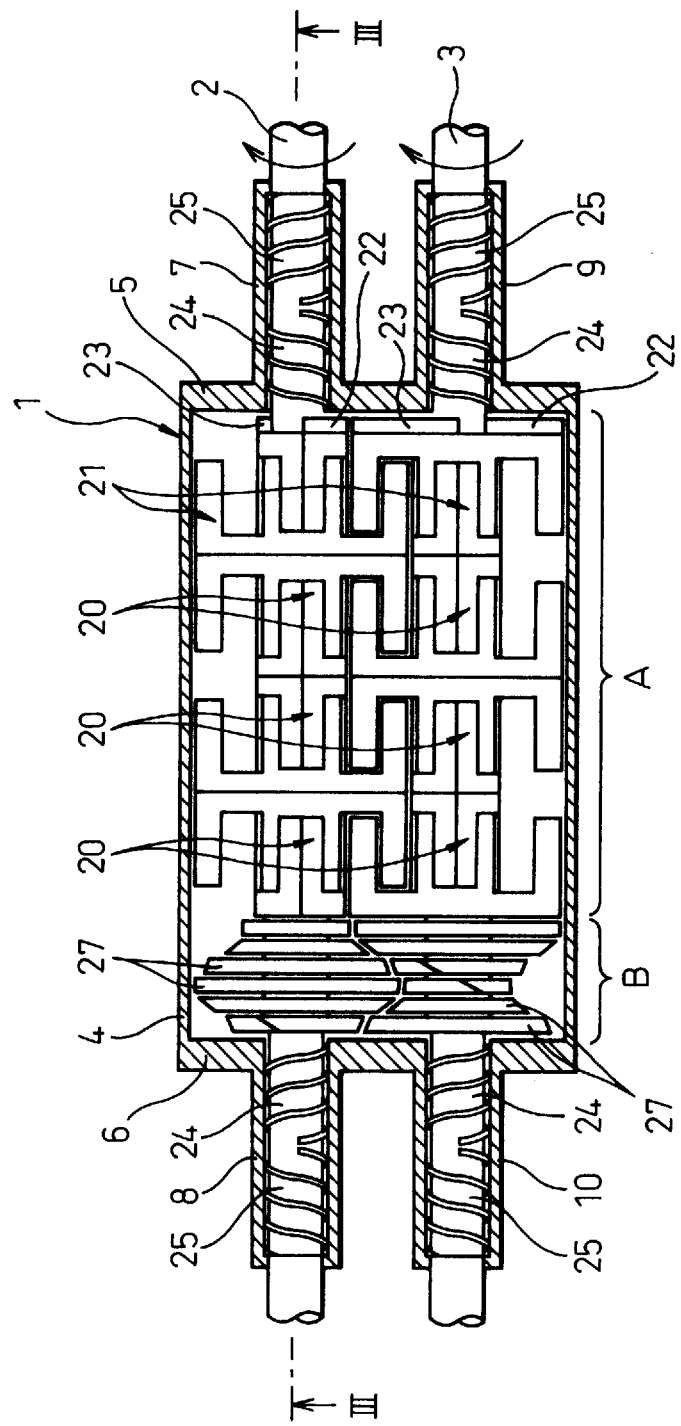
FIG. 2 is a cross-sectional plan view of the stirring device.
Figure 3:
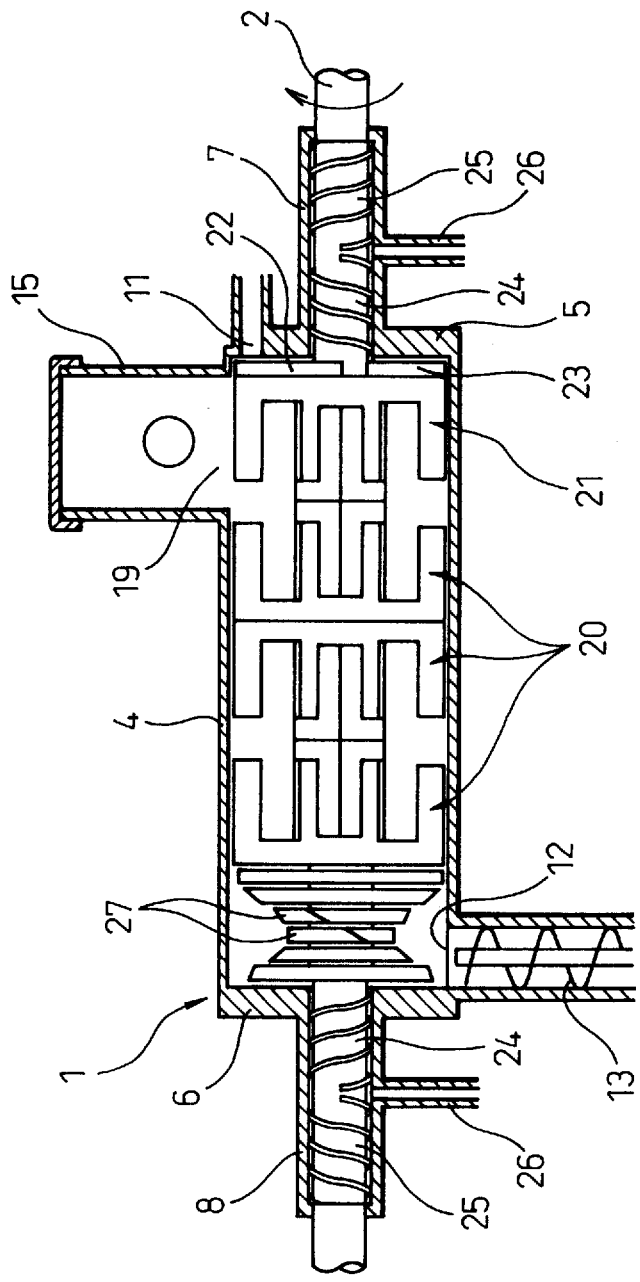
FIG. 3 is a cross-sectional view of the stirring device, taken along the line III—III in FIG. 2.

As illustrated in FIGS. 2 and 3, the opposing ends of the first rotary shaft 2 project from the outer walls of the end plates 5 and 6, and tubular members 7 and 8 surrounding the opposed ends of the first rotary shaft 2 are formed on the outer walls of the end plates 5 and 6, respectively. The first rotary shaft 2 is rotatably supported by the tubular members 7 and 8, and thus, these tubular members 7 and 8 constitute bearings for the first rotary shaft 2.

The opposing ends of the second rotary shaft 3 also project from the outer walls of the end plates 5 and 6, and tubular members 9 and 10 surrounding the opposing ends of the second rotary shaft 3 are formed on the outer walls of the end plates 5 and 6, respectively. The second rotary shaft 3 is rotatably supported by the tubular members 9 and 10, and thus, these tubular members 9 and 10 constitute bearings for the second rotary shaft 3.

As illustrated in FIGS. 1 and 3, a viscous liquid inlet port 11 is formed on the top portion of the flat inner wall of the end plate 5 above the first rotary shaft 2. In addition, a viscous liquid outlet port 12 is formed on the bottom wall of the shell 4, which is located near the end plate 6. A viscous liquid is fed into the vessel 4 from the viscous liquid inlet port 11. Then, the viscous liquid is caused to gradually move in the vessel 4, while being molten polymerized, toward the viscous liquid outlet port 12 and discharged from the viscous liquid outlet port 12 by a rotary screw 13. Accordingly, the end plate 5 is hereinafter referred to as an inlet side end plate, and the end plate 6 is hereinafter referred to as an outlet side end plate.

As illustrated in FIG. 1, a vacuum suction apparatus 14 is arranged on the vessel 4 for sucking a generating gas to promote the molten polymerizing reaction in the vessel 4. The vacuum suction apparatus 14 comprises an increased diameter duct 15, a reduced diameter duct 16 and a connecting duct 17 extending downward from the increased diameter duct 15 to the reduced diameter duct 16. A catch pot 18 for trapping oligomer is attached to the lower end of the reduced diameter duct 16, and the upper end of the reduced diameter duct 16 is connected to a vacuum pump via a cooler (not shown). A vent port 19 of the increased diameter duct 15 is formed on the upper wall of the shell 4 above the first rotary shaft 2 at a position adjacent to the inlet side end plate 5.

The vacuum suction apparatus 14 has two functions. The first function is to maintain the interior of the vessel 4 at vacuum pressure to extract a generating gas from the inside of the viscous liquid to promote the molten polymerizing reaction. The second function is to suck the generating gas out from the interior of the vessel 4.

A plurality of rotors are mounted on the rotary shafts 2 and 3. These rotors comprise a first rotor group A and a second rotor group B, as indicated in FIG. 2. The first rotor group A serves to stir the viscous liquid, and the second rotor group B serves to move the viscous liquid forward toward the outlet side end plate 6 while stirring the viscous liquid. Accordingly, as can be seen from FIGS. 1 and 2, the second rotor group B has a screw shaped general construction.

Figure 5A:
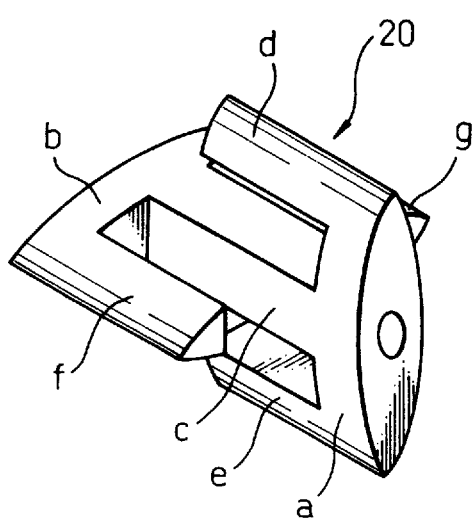
FIGS. 5A and 5B are perspective views of the rotors.
Figure 5B:
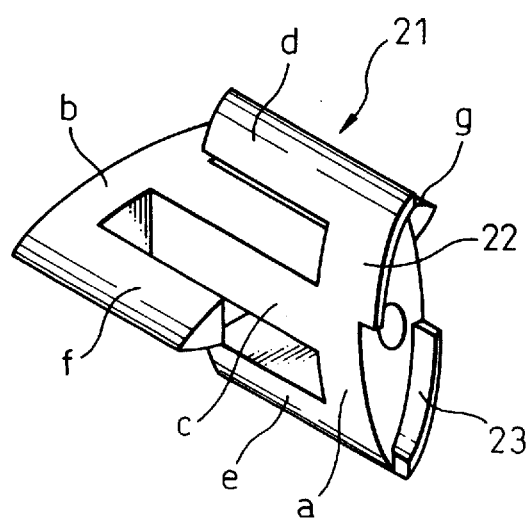

FIG. 5A illustrates a perspective view of one of the rotors 20 of the first rotor group A, and FIG. 5B illustrates a perspective view of the end rotor 21 of the first rotor group A, which is positioned adjacent to the inlet side end plate 5. Accordingly, all the rotors 20 of the first rotor group except for the end rotor 21 have the same shape as shown in FIG. 5A.

As illustrated in FIG. 5A, the rotor 20 comprises a first rotor plate a having a spindle shaped outer contour, a second rotor plate b having a spindle shaped contour and rotated by 90 degrees with respect to the first rotor plate a, a bridging portion c interconnecting the central portion of the first rotor plate a to the central portion of the second rotor plate b, a pair of horizontal bars or scrapers d and e extending in the axial direction from the opposing ends of the first rotor plate a, and a pair of scrapers f and g extending in the axial direction from the opposing ends of the second rotor plate b. The rotor plates a and b, the connecting portion c and the horizontal bars d, e, f, g are formed in one piece.

The end rotor 21 illustrated in FIG. 5B has a construction which is almost the same as that of the rotor 20 illustrated in FIG. 5A, except for that a pair of scrapers 22 and 23 are formed on the end face of the first rotor plate a, which faces the flat inner wall of the inlet side end plate 5.

The rotor 21 and a plurality of the rotors 20 are mounted on the first rotary shaft 2 so that the second rotor plate b of the rotor 21 is aligned with the first rotor plate a of the adjacent rotor 20, and that the second rotor plate b of the rotor 20 is aligned with the first rotor plate a of the adjacent rotor 20. Similarly, the rotor 21 and a plurality of the rotors 22 are mounted on the second rotary shaft 3 so that the second rotor plate b of the rotor 21 is aligned with the first rotor plate a of the adjacent rotor 20, and that the second rotor plate b of the rotor 20 is aligned with the first rotor plate a of the adjacent rotor 20.

The rotor 21 of the first rotary shaft 2 and the adjacent rotor 21 of the second rotary shaft 3 have a positional relationship such that the rotor 21 of the second rotary shaft 3 is rotated by 90 degrees with respect to the rotor 21 of the first rotary shaft 2. Similarly, the rotor 20 of the first rotary shaft 2 and the adjacent rotor 20 of the second rotary shaft 3 have a positional relationship such that the rotor 20 of the second rotary shaft 3 is rotated by 90 degrees with respect to the rotor 20 of the first rotary shaft 2.

Each rotor 20 and 21 rotates while keeping a small distance from the corresponding cylindrical inner walls of the shell 4. In addition, each rotor 20 and 21 of the first rotary shaft 2 rotates while keeping a small clearance from the corresponding adjacent rotor 20 and 21 of the second rotary shaft 3.

When the operation of the stirring device is started, a viscous liquid fed into the vessel 1 from the viscous liquid inlet port 11 is stirred by the rotors 20 and 21. At this time, as mentioned earlier, if the viscous liquid stagnates somewhere in the vessel 1, the polymer to be produced will deteriorate. In this regard, it has been proven that the stagnation of the viscous liquid does not take place in the rotors 20, but the stagnation of the viscous liquid takes place around the rotor 21, particularly, on the inlet side end plate 5. In addition, it has been also proven that the location of the viscous liquid inlet port 11 has a great influence on the stagnation of the viscous liquid. Next, this will be explained with reference to FIGS. 6A and 6B.

Figure 6A:
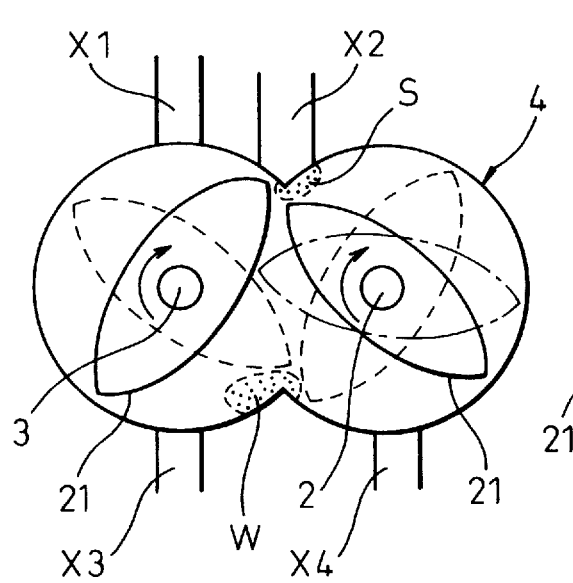
FIGS. 6A and 6B are schematically illustrated side views of the stirring device, for illustrating various arrangements of the viscous liquid inlet port.

FIG. 6A illustrates various arrangements of the viscous liquid inlet ports X1, X2, X3 and X4. Where the viscous liquid inlet port X1 is arranged above the second rotary shaft 3 as illustrated in FIG. 6A, a viscous liquid fed from the viscous liquid inlet port X1 drops on the outer wall of the rotor 21 of the second rotary shaft 3. Then, a part of the viscous liquid flows downward along the outer wall of the rotor 21 of the second rotary shaft 3, and a part of the viscous liquid flows downward along the inner wall of the inlet side end plate 5. Then, the viscous liquid reaches the bottom wall of the vessel 1 beneath the second rotary shaft 3 and is accumulated thereon.

A part of the viscous liquid thus accumulated is trapped by the tip edge of the rotor 21 of the second rotary shaft 3 and then lifted upward. After this, the viscous liquid thus lifted upward moves downward again along the outer wall of the rotor 21 of the second rotary shaft 3 on one hand and along the inner wall of the inlet side end plate 5 on the other hand.

In this way, the viscous liquid repeatedly flows downward along the outer wall of the rotor 21 of the second rotary shaft 3, and thus, the viscous liquid does not stagnate on the outer wall of the rotor 21 of the second rotary shaft 3. In addition, the viscous liquid repeatedly flows downward along the inner wall of the inlet side end plate 5, which faces the end face of the rotor 21 of the second rotary shaft 3, and thus, the viscous liquid also does not stagnate on the inner wall of the inlet side end plate 5, which faces the end face of the rotor 21 of the second rotary shaft 3.

Furthermore, the viscous liquid on the cylindrical inner wall of the shell 4 is repeatedly lifted upward by the tip edge of the rotor 21 of the second rotary shaft 3. Namely, the viscous liquid on the cylindrical inner wall of the shell 4 is caused to move along the cylindrical inner wall of the shell 4, and thus, this viscous liquid also does not stagnate.

As mentioned above, where the viscous liquid inlet port X1 is arranged above the second rotary shaft 3, the stagnation of the viscous liquid does not take place anywhere around the rotor 21 of the second rotary shaft 3. Accordingly, the deterioration of the viscous liquid does not occur around the rotor 21 of the second rotary shaft 3.

In this case, however, the stagnation of the viscous liquid takes place around the rotor 21 of the first rotary shaft 2. Namely, as mentioned above, the viscous liquid accumulated on the bottom wall of the vessel 1 beneath the second rotary shaft 3 is trapped and lifted upward by the tip edge of the rotor 21 of the second rotary shaft 3. Then, a part of this viscous liquid flows downward along the outer wall of the rotor 21 of the second rotary shaft 3 and along the inner wall of the inlet side end plate 5. In addition, a part of this viscous liquid is fed onto the tip edge of the rotor 21 of the first rotary shaft 2, as illustrated by S in FIG. 6A. Then, this viscous liquid is caused to move along the cylindrical inner wall of the shell 4. Then, a part of this viscous liquid is caused to further move along the cylindrical inner wall of the shell 4 around the first rotary shaft 2, and a part of this viscous liquid flows downward along the outer wall of the rotor 21 of the first rotary shaft 2 and along the inner wall of the inlet side end plate 5, which faces the end face of the rotor 21 of the first rotary shaft 2.

However, the amount of the viscous liquid S fed onto the tip edge of the rotor 21 of the first rotary shaft 2 is very small. Accordingly, the viscous liquid flowing downward along the outer wall of the rotor 21 of the first rotary shaft 2 and along the inner wall of the inlet side end plate 5 stops half way before it reaches the bottom wall of the shell 4. Namely, the viscous liquid stagnates around the rotor 21 of the first rotary shaft 2. In this way, if the amount of the viscous liquid fed onto the outer wall of the rotor 21 of the first rotary shaft 2, the stagnation of the viscous liquid takes place around the rotor 21 of the first rotary shaft 2, and as a result, the deterioration of the polymer to be produced will occur.

Where the viscous liquid inlet port X2 is formed on the upper wall of the shell 4 at a position centrally between the first rotary shaft 2 and the second rotary shaft 3 as illustrated in FIG. 6A, a part of the viscous liquid fed from the viscous liquid inlet port X2 drops on the rotor 21 of the first rotary shaft 2. However, also in this case, the deterioration of the polymer to be produced will occur.

Namely, in this case, the viscous liquid drops from the viscous liquid inlet port X2 on the upper wall of the tip portion of the rotor 21 of the first rotary shaft 2. However, the upper wall of the tip portion of the rotor 21 of the first rotary shaft 2 is inclined downward during the time the rotor 21 of the first rotary shaft 2 rotates from the position shown by the broken line to the position shown by the dot-slash line in FIG. 6A, and the viscous liquid drops on the upper wall of the tip portion of the rotor 21 of the first rotary shaft 2 at a position near the tip edge of the rotor 21 of the first rotary shaft 2. Accordingly, the viscous liquid fed onto the upper wall of the tip portion of the rotor 21 of the first rotary shaft 2 drops from the tip edge of the rotor 21 of the first rotary shaft 2, and thus, the amount of the viscous liquid trapped by the rotor 21 of the first rotary shaft 2 is small.

In this way, where the viscous liquid inlet port X2 is arranged at a position centrally between the first rotary shaft 2 and the second rotary shaft 3, since the amount of the viscous liquid fed onto the outer wall of the rotor 21 of the first rotary shaft 2 is small, the viscous liquid stagnates around the rotor 21 of the first rotary shaft 2, and thus the polymer to be produced will deteriorate.

Where the viscous liquid inlet port X3 is arranged beneath the second rotary shaft 3, the viscous liquid is fed onto the tip portion of the rotor 21 of the first rotary shaft 2 from the rotor 21 of the second rotary shaft 3 as illustrated by S in FIG. 6A, and thus, the amount of the viscous liquid fed onto the outer wall of the rotor 21 of the first rotary shaft 2 is very small.

In addition, where the viscous liquid inlet port X4 is arranged beneath the first rotary shaft 2, the viscous liquid fed from the viscous liquid inlet port X4 is fed onto the bottom wall of the shell 4 by the rotor 21 of the first rotary shaft 2, as illustrated by W in FIG. 6A when the rotors 21 rotate to the positions illustrated by the broken lines in FIG. 6A. Then, the viscous liquid is fed onto the tip portion of the rotor 21 of the first rotary shaft 2 from the rotor 21 of the second rotary shaft 3 as illustrated by S in FIG. 6A. Accordingly, also in this case, the amount of the viscous liquid fed onto the outer wall of the rotor 21 of the first rotary shaft 2 is very small.

In this way, where the viscous liquid inlet port is arranged on the bottom wall of the shell 4 as illustrated by X3 and X4 in FIG. 6A, since the amount of the viscous liquid fed onto the outer wall of the rotor 21 of the first rotary shaft 2 is small, the viscous liquid stagnates around the rotor 21 of the first rotary shaft 2, and thus the polymer to be produced will deteriorate.

Figure 6B:
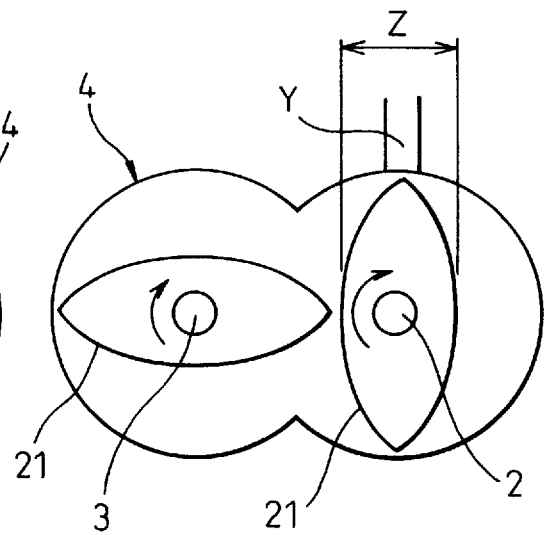

Contrary to this, where the viscous liquid inlet port Y is arranged above the first rotary shaft 2 as illustrated in FIG. 6B, the viscous liquid fed from the viscous liquid inlet port Y drops on the outer wall of the rotor 21 of the first rotary shaft 2. In this case, since the amount of the viscous liquid fed onto the outer wall of the rotor 21 of the first rotary shaft 2 is large, the viscous liquid fed onto the outer wall of the rotor 21 of the first rotary shaft 2 flows downward along the outer wall of the rotor 21 of the first rotary shaft 2 and along the inner wall of the inlet side end plate 5, which faces the end face of the rotor 21 of the first rotary shaft 2, without stopping half way, and then reaches the bottom wall of the shell 4.

Accordingly, in this case, the viscous liquid does not stagnate around the rotor 21 of the first rotary shaft 2, and thus, there is no danger of the polymer to be produced deteriorating.

In addition, the viscous liquid accumulated on the bottom wall of the shell 4 beneath the first rotary shaft 2 is fed onto the bottom wall of the shell 4 beneath the second rotary shaft 3, as illustrated by W in FIG. 6A. Then, this viscous liquid is lifted upward by the tip edge of the rotor 21 of the second rotary shaft 3 and then flows downward along the outer wall of the rotor 21 of the second rotary shaft 3 and along the inner wall of the inlet side end plate 5, which faces the end face of the rotor 21 of the second rotary shaft 3. Accordingly, the viscous liquid also does not stagnate around the rotor 21 of the second rotary shaft 3, and thus, there is no danger of the polymer to be produced deteriorating.

As mentioned above, if almost all the viscous liquid fed from the viscous liquid inlet port Y drops on the outer wall of the rotor 21 of the first rotary shaft 2, the viscous liquid does not stagnate around both the rotor 21 of the first rotary shaft 2 and the rotor 21 of the second rotary shaft 3. Accordingly, the viscous liquid inlet port Y can be arranged within the range Z in FIG. 6B, i.e., within an upper region of the rotor 21 of the first rotary shaft 2, when the rotor 21 of the first rotary shaft 2 is at a position such that the transverse width of the rotor 21 of the first rotary shaft 2 becomes minimum. If using a general expression, the viscous liquid inlet port Y can be arranged on the upper portion of the inlet side end portion of the interior of the vessel 1 at a position above the first rotary shaft 2. In this case, since the first rotary shaft 2 rotates in a direction such that the upper face thereof moves away from the second rotary shaft 3, and the second rotary shaft rotates in a direction such that the upper face thereof moves towards the first rotary shaft 2, the first rotary shaft 2 can be defined by using this expression.

In the embodiment illustrated in FIGS. 1 through 4, the viscous liquid inlet port 11 is formed on the top portion of the inlet side end plate 5 above the first rotary shaft 2, but is not arranged above the rotor 21 of the first rotary shaft 2. However, even if the viscous liquid inlet port 11 is formed on the top portion of the inlet side end plate 5 above the first rotary shaft 2, it is possible to prevent the viscous liquid from stagnating as in the case where the viscous liquid inlet port 11 is arranged above the rotor 21 of the first rotary shaft 2.

Namely, where the viscous liquid inlet port 11 is formed on the top portion of the inlet side end plate 5, a part of the viscous liquid fed from the viscous liquid inlet port 11 flows downward along the inner wall of the inlet side end wall 5 without stopping half way, and a part of the viscous liquid fed from the viscous liquid inlet port 11 flows downward along the outer wall of the rotor 21 of the first rotary shaft 2 without stopping half way. Accordingly, also in this case, the viscous liquid does not stagnate around the rotor 21 of the first rotary shaft 2.

FIG. 7 illustrates an alternative embodiment of the arrangement of the viscous liquid inlet port 11. In this embodiment, the viscous liquid inlet port 11 is arranged above the first rotary shaft 2 and above the rotor 21 thereof.

As mentioned above, it is possible to prevent the viscous liquid from stagnating in the vessel 1 by feeding the viscous liquid from the upper portion of the vessel 1 above the first rotary shaft 2. In the embodiment illustrated in FIGS. 1 through 4, to further prevent the viscous liquid from stagnating in the vessel 1, a pair of the scrapers 22 and 23 are formed on the end face of each rotor 21, which faces the inner wall of the inlet side end plate 5.

Figure 4:
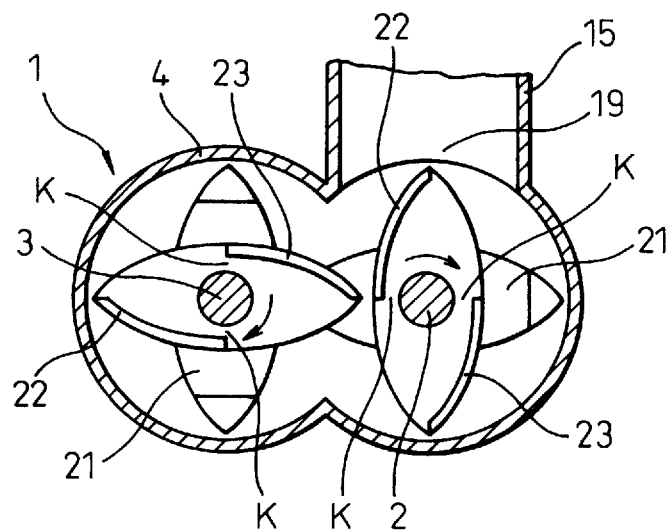
FIG. 4 is a cross-sectional side view of the stirring device.

As illustrated in FIGS. 4 and 5B, the scrapers 22 and 23 are point-symmetrically arranged with respect to the rotational axis of the rotor 21 and extend archwise from approximately the center of the archwise extending peripheral edges of the end face of the rotor 21 to the opposing tip ends of the end face of the rotor 21 along the archwise extending peripheral edges of the end face of the rotor 21. In the embodiment illustrated in FIGS. 4 and 5B, the scrapers 22 and 23 have the same width and the same height over the entire length thereof and, as can been seen from FIG. 4, clearances K exist between the scrapers 22, 23 and the rotary shafts 2, 3. As shown in FIGS. 2 and 3, the rotors 21 are mounted on the rotary shafts 2 and 3 so that clearances exist between the inner wall of the inlet side end plate 5 and the top faces of the scrapers 22, 23.

When the rotary shafts 2 and 3 are rotated, and the viscous liquid is fed into the vessel 1 from the viscous liquid inlet port 11, the viscous liquid on the inner wall of the inlet side end plate 5 is trapped by the scrapers 22 and 23. At this time, since the scrapers 22 and 23 are formed so that they extend along the archwise extending peripheral edges of the end faces of the rotor 21 as mentioned above, the trapped viscous liquid is subject to being forced to move towards the clearances K by the scrapers 22 and 23. As a result, the trapped viscous liquid flows along the scrapers 22 and 23 and passes through the clearances K. Then, the trapped viscous liquid is pushed out from the end face of the rotor 21.

In this way, the viscous liquid is caused to flow by the scrapers 22 and 23, and thus, it is possible to further prevent the viscous liquid from stagnating on the inner wall of the inlet side end plate 5. However, in this case, there is a danger that the viscous liquid may stagnate around the rotary shafts 2 and 3. Therefore, in the embodiment illustrated in FIGS. 1 through 4, spiral grooves 24 and 25 are formed on the portions of the rotary shafts 2 and 3, which are positioned in the tubular members 7, 8, 9 and 10 to remove the polymers existing around the rotary shafts 2 and 3.

As can been seen from FIGS. 2 and 3, the spiral groove formed on each rotary shafts 2 and 3 comprises a first spiral groove 24 formed on the rotor side, and a second spiral groove 25 formed on the outer side. The spiral direction of each first spiral groove 24 is determined so that the polymer existing around the rotary shafts 2 and 3 can be conveyed toward the outside when the rotary shafts 2 and 3 are rotated. Conversely, the spiral direction of each second spiral groove 25 is reverse to that of the first spiral groove 24 so that the polymer can be conveyed toward the rotors 21. Downward extending polymer extraction tubes 26 are formed on the bottom walls of the tubular members 7, 8, 9 and 10 at positions at which the outer ends of the first spiral grooves 24 meet the inner ends of the second spiral grooves 25.

When the stirring device is operated, the polymer existing around the shafts 2 and 3 is conveyed outward by the first spiral grooves 24. At this time, even if the polymer enters into the second spiral grooves 25, the polymer is conveyed back toward the rotor 21. Therefore, the polymer is forced into the polymer extraction tubes 26 and discharged to the outside. Note that, where the interior of the vessel 1 must be maintained at a vacuum pressure as in the embodiment illustrated in FIGS. 1 through 4, it is necessary to provide some sealing means for each polymer extracting tube 26 to prevent the outside air from entering into the vessel 1 via the polymer extraction tubes 26.

Figure 8:
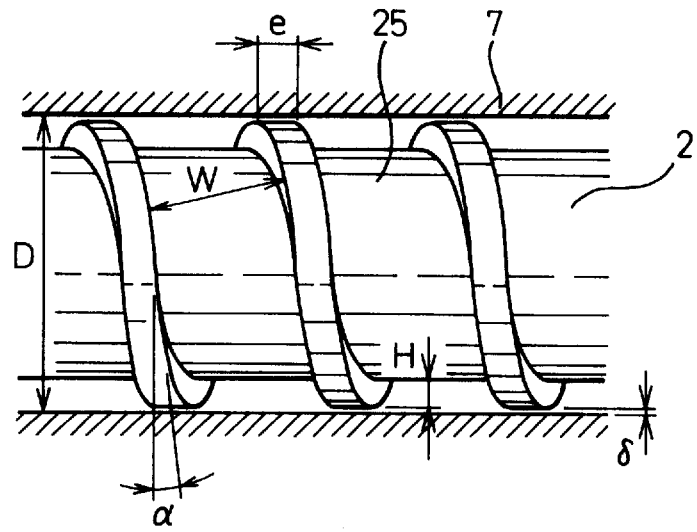
FIG. 8 is a side view of a portion of the rotary shaft, which is located in the tubular member.

FIG. 8 illustrates a typical shape of the spiral grooves 24, 25. In an example illustrated in FIG. 8, the inner diameter D of the tubular member 7 is 150 mm, the width W of the spiral groove 25 is 75 mm, the depth H of the spiral groove 25 is 8 mm, the distance e between the adjacent spiral grooves 25 is 6 mm, the clearance 8 is 2 mm, and the spiral angle a is 35 degrees.

As mentioned earlier, the vent port 19 of the vacuum suction apparatus 14 is formed on the upper wall of the shell 4 above the first rotary shaft 2 at a position adjacent the inlet side end plate 5. Namely, since the molten polymerizing reaction is started as soon as the viscous liquid is fed into the vessel 1, and since the molten polymerizing reaction is very active at this stage, a large amount of the reaction gas is generated in the inlet side end portion of the interior of the vessel 1. Therefore, the vent port 19 for sucking the reaction gas is arranged in the inlet side end portion of the interior of the vessel 1. However, if the vent portion 19 is arranged in the inlet side end portion of the interior of the vessel 1, there is a danger that the viscous liquid may stagnate in the vent port 19 and close it.

Namely, as mentioned earlier, the viscous liquid can be trapped by the tip edge of the rotor 21, i.e., by the tip edge of the horizontal bars d of the rotor 21. Accordingly, if the vent port 19 and the scrapers d of the rotor 21 of the first rotary shaft 2 are formed so that the axial lengths of the scrapers d are larger than the diameter of the bent port 19, and that the horizontal bars d pass through in front of the entire area of the vent port 19, the viscous liquid trapped by the horizontal bars d of the rotor 21 of the first rotary shaft 2 stagnates in the vent port 19. As a result, there occurs a problem in that the viscous liquid is sucked into the vacuum suction apparatus 14 to cause it to be clogged with the viscous liquid, and that the membrane of the viscous liquid is formed in the vent port 19 to temporarily cause the function of the vacuum pressure in the vessel 1. Such a phenomena is normally called a "vent up".

Figure 9:
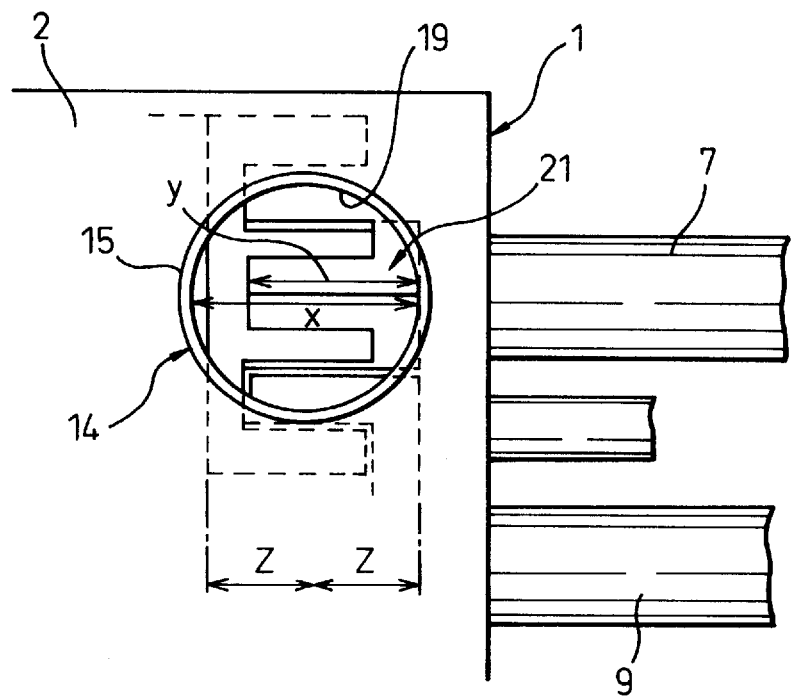
FIG. 9 is an enlarged plan view of a portion of the vessel illustrated in FIG. 1.

In the embodiment illustrated in FIGS. 1 through 4, to prevent the occurrence of "vent up", as shown in FIG. 9, the size of the vent port 19 is determined so that the scrapers d of the rotor 21, i.e., the outer edge of the rotor 21 pass through in front of a portion of the entire area of the vent port 19. In this case, according to experiments conducted by the inventors, it has been proven that, if the diameter x of the vent port 19 is 1.15 times or more larger than the maximum length y of a portion of the outer edge of the rotor 21, which portion faces the vent port 19, it is possible to prevent the occurrence of "vent up". Accordingly, in the embodiment shown in FIGS. 1 through 4, the size of the vent port 19 is determined so that x/y becomes larger than 1.15. In addition, it is preferable that the vent port 19 be arranged so that the center thereof is located at a position immediately above the central axis of the first rotary shaft 2 and equally distanced from the opposing end faces of the rotor 21, as shown by Z in FIG. 9.

The stagnation of the viscous liquid takes place not only in the inlet side end portion of the interior of the vessel 1 but also in the outlet side end portion of the interior of the vessel 1. Namely, the viscous liquid fed from the viscous liquid inlet port 11 gradually moves toward the viscous liquid outlet port 12 and is discharged from the viscous liquid outlet port 12. At this time, if a sufficient amount of the viscous liquid is not fed onto the inner wall of the outlet side end plate 6, the viscous liquid stagnates on the inner wall of the outlet side end plate 6, and as a result, the deterioration of the polymer to be produced occurs on the inner wall of the outlet side end plate 6. Accordingly, in the embodiment illustrated in FIGS. 1 through 4, to feed a sufficient amount of the viscous liquid onto the inner wall of the outlet side end plate 6, the second rotor group B having a screw shaped general construction is provided in the outlet side end portion of the interior of the vessel 1.

Figure 10:
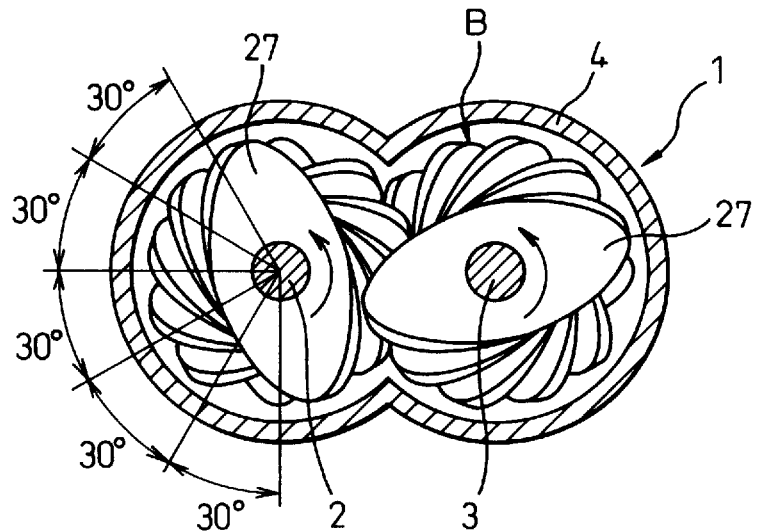
FIG. 10 is a cross-sectional side view of the stirring device.
Figure 11:
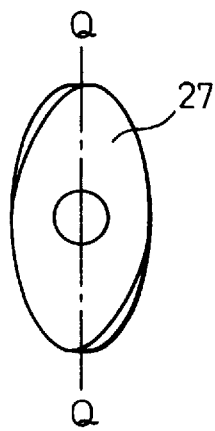
FIG. 11 is a front view of the rotor illustrated in FIG. 10.
Figure 12:
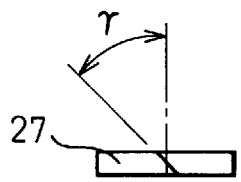
FIG. 12 is a plan view of the rotor illustrated in FIG. 10.

As illustrated in FIGS. 2 and 10, the second rotor group B comprises a plurality of spaced rotors 27 arranged on the rotary shafts 2 and 3. As illustrated in FIGS. 11 and 12, each rotor 27 has a plate shape and a spindle shaped contour. The peripheral outer wall of the rotor 27 is twisted about the axis Q passing through the opposed tip ends of the rotor 27 so that the twisting angle thereof becomes larger toward the opposing tip ends of the rotor 27 and, in the embodiment shown in FIGS. 1 through 4, the twisting angle γ at the opposing tip ends of the rotor 27 is about 65 degrees.

In the embodiment shown FIG. 10, each rotor 27 mounted on the first rotary shaft 2 is arranged so that it is rotated by approximately 30 degrees with respect to the adjacent rotor 27 in a direction such that the twisting top edges of the rotors 27 are aligned with each other. Accordingly, the rotors 27 of the first rotary shaft 2 constitute a screw having a function of feeding the viscous liquid toward the inner wall of the outlet side end plate 6 when the first rotary shaft 2 is rotated. Similarly, each rotor 27 mounted on the second rotary shaft 3 is also arranged so that it is rotated by 30 degrees with respect to the adjacent rotor 27 in a direction such that the twisting top edges of the rotors 27 are aligned with each other. Accordingly, the rotors 27 of the second rotary shaft 3 constitute a screw having a function of feeding the viscous liquid toward the inner wall of the outlet side end plate 6 when the second rotary shaft 3 is rotated.

In addition, as can been seen from FIG. 10, each rotor 27 of the second rotary shaft 3 is arranged so that it is rotated by 90 degrees with respect to the adjacent rotor 27 of the first rotary shaft 2. Each rotor 27 rotates while keeping a distance from the corresponding cylindrical inner wall of the shell 4, and the adjacent two rotors 27 of the first rotary shaft 2 and the second rotary shaft 3 rotate while keeping a slight clearance therebetween. Accordingly, the second rotor group B also has a function of stirring the viscous liquid.

In the embodiment illustrated in FIGS. 1 through 4, the viscous liquid is forced to move toward the inner wall of the outlet side end plate 6 by the rotors 27 of the second rotor group B after passing through the first rotor group A. As a result, since a sufficient amount of the viscous liquid can be fed onto the inner wall of the outlet side end plate 6, there is no danger that the viscous liquid may stagnate on the inner wall of the outlet side end plate 6, and thus, it is possible to prevent the occurrence of the deterioration of the polymer to be produced.

Figure 13:
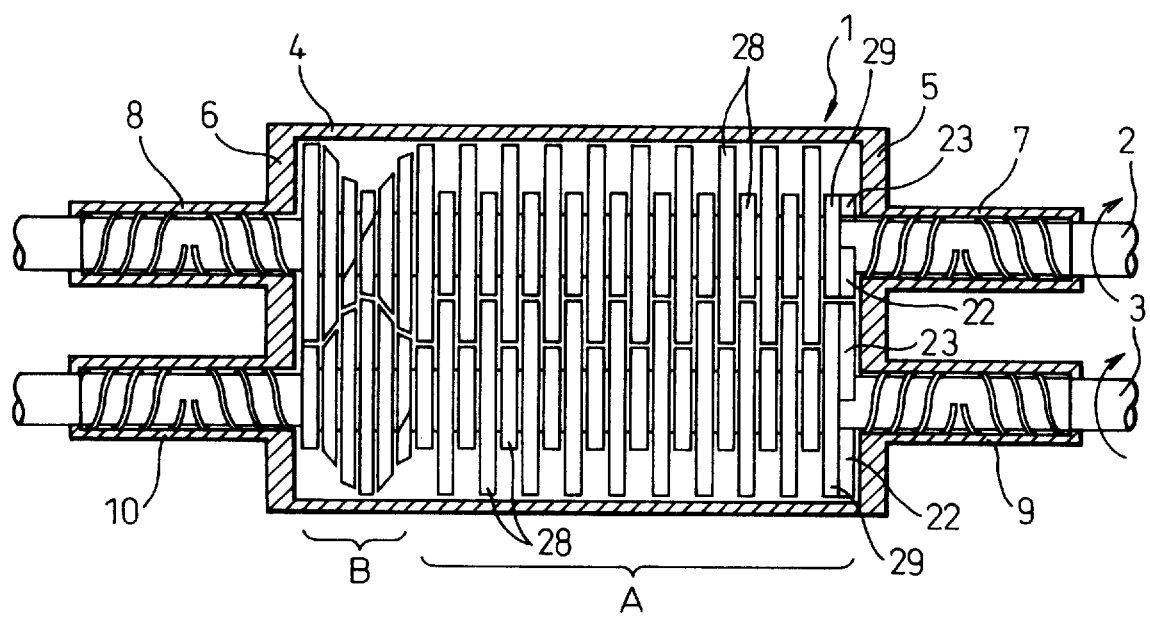
FIG. 13 is a cross-sectional plan view of another embodiment of the stirring device.

FIG. 13 illustrates another embodiment of the stirring device. The difference in construction between the stirring device shown in FIGS. 1 through 4 and the stirring device shown in FIG. 13 resides basically only in the construction of the first rotor group A, and thus, only the construction of the first rotor group A will be explained hereinafter.

Figure 14A:
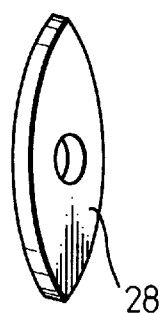
FIGS. 14A and 14B are perspective views of the rotors illustrated in FIG. 13.
Figure 14B:
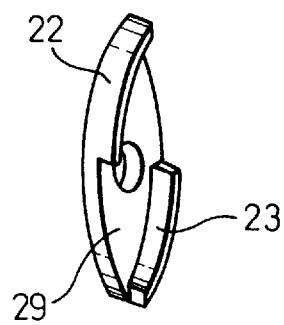

Referring to FIG. 13, the first rotor group A comprises a plurality of spaced rotors 28 mounted on the rotary shafts 2 and 3. Only the rotors 29 arranged to face the inner wall of the inlet side end plate 5 have scrapers 22 and 23 on the end faces thereof, as illustrated in FIG. 14B. The remaining rotors 28 have a plate shape and a spindle shaped contour as illustrated in FIG. 14A. Each rotor 28 of the first rotary shaft 2 is arranged so that it is rotated by 90 degrees with respect to the adjacent rotor 28, and similarly, each rotor 28 of the second rotary shaft 3 is also arranged so that it is rotated by 90 degrees with respect to the adjacent rotor 28. In addition, each rotor 28 of the second rotary shaft 3 is arranged so that it is rotated by 90 degrees with respect to the adjacent rotor 28 of the first rotary shaft 2.

The stirring device according to the present invention is suitable for stirring a highly viscous liquid such as a molten polymer and especially can be effectively applied to a molten polymerization of an aromatic polycarbonate. Therefore, the present invention involves a method for producing an aromatic polycarbonate having a higher polymerization extent by further molten polymerizing a polycarbonate which results from a molten polymerization of an aromatic dihydroxy compound with a carbonic diester, preferably a polycarbonate with an intrinsic viscosity in the order of 0.2 to 0.35 (q) with the above stirring device under vacuum pressure.

The aromatic dihydroxy compound employed herein includes, for example, bis-(hydroxyaryl) alkanes, such as, 2,2-bis(4-hydroxyphenyl) propane, 2,2-bis(4-hydroxyphenyl) butane, 2,2-bis(4-hydroxyphenyl) octane, bis(4-hydroxyphenyl) phenylmethane, 2,2-bis(4-hydroxy-3-methylphenyl) propane, 1,1-bis(4-hydroxy-t-butylphenyl) propane, bis-(hydroxyaryl) cycloalkanes, such as, 1,1-bis(4-hydroxyphenyl) cyclopentane, 1,1-bis(hydroxyphenyl) cyclohexane, dihydroxyarylethers, such as 4,4'-dihydroxydiphenylether, dihydroxyarylsulfides, such as 4,4'-dihydroxydiphenylsulfide, dihydroxyarylsulfoxides, such as 4,4'-dihydroxydiphenylsulfoxide, dihydroxyarylsulfones, such as 4,4'-dihydroxydiphenylsulfone. Among others, it is preferably 2,2-bis(4-hydroxyphenyl) propane.

Examples of carbonic diester can be esters of optionally substituted aryl or aralkyl having 6 to 10 carbons and the like. Specifically, it can be diphenyl carbonate, ditolyl carbonate, bis(chlorophenyl) carbonate, m-cresyl carbonate, dinaphtyl carbonate, bis(diphenyl) carbonate and the like.

The molten polymerization reaction of an aromatic dihydroxy compound and carbonic diester is carried out, as previously known, by stirring under heat in an inert atmosphere while distilling out the produced aromatic monohydroxy compound. The reaction temperature usually ranges from 120° to 350° C., and at the late term of the reaction, the level of the vacuum pressure is increased to 10 to 0.1 Torr for ease of distilling out the produced aromatic monohydroxy compound, whereby a polycarbonate with an intrinsic viscosity on the order of 0.2 to 0.35 (i) can be obtained.

The intrinsic viscosity (η) hereby was determined with a Ubbelohde viscometer using a solution of 0.7 g/l of methylene chloride.

According to the present invention, an aromatic polycarbonate with an intrinsic viscosity on the order of 0.3 to 0.7 (η) having good optical properties can be obtained by further feeding the polycarbonate thus produced and having a molten viscosity in the order of thousands poise, into the stirring device according to the present invention, and then continuing the stir mixing and thus continuously polymerizing the same within this stirring device to increase the polymerization extent to a molten viscosity of 20,000 to 30,000 poise.

In the late-polymerization stage, a reaction temperature of 120° to 350° C., especially 170° to 300° C., a pressure of 10 to 0.1 Torr, especially 1 to 0.1 Torr, and a reaction period (the retention time within the stirring device) of 30 to 120 min. can be suitably employed.

While the invention has been described by reference to specific embodiments chosen for purposes of illustration, it should be apparent that numerous modifications could be made thereto by those skilled in the art without departing from the basic concept and scope of the invention.

We claim:

1. A device for stirring a viscous liquid comprising:
   a vessel comprised of two parallel intersecting cylindrical shells having an inlet side end plate arranged at one end thereof, and an outlet side end plate arranged at an opposite end thereof;
   a first rotary shaft extending in a substantially horizontal plane in said vessel and having thereon a plurality of rotors thereon;
   a second rotary shaft extending in parallel to said first rotary shaft in said substantially horizontal plane in said vessel and having thereon a plurality of rotors which cooperate with the rotors of said first rotary shaft to stir a viscous liquid, said first rotary shaft and said second rotary shaft being rotatable in the same direction;
   a viscous liquid inlet port arranged to open into an upper portion of said vessel directly above said first rotary shaft adjacent an inlet side end portion of said vessel; said first rotary shaft rotating in a direction to enable said rotors thereon to direct viscous liquid in the upper portion of said vessels directly above the first rotary shaft in a direction away from said second rotary shaft and
   a viscous liquid outlet port arranged at an outlet side end portion of said vessel.

2. A device according to claim 1, wherein said viscous liquid inlet port is arranged on an inner wall of the upper portion of said inlet side end plate above said first rotary shaft.

3. A device according to claim 1, wherein said vessel has a top face and said viscous liquid inlet port is arranged to open at said top face of said vessel above said first rotary shaft.

4. A device according to claim 1, wherein the rotors of said first rotary shaft include an end rotor having a substantially elliptical shaped contour and located adjacent said inlet side end plate.

5. A device according to claim 1, wherein said viscous liquid outlet port is arranged on a bottom wall of said vessel.

6. A device according to claim 1, wherein the rotors on said first and second rotary shafts each include an end rotor arranged adjacent the inlet side end plate and each end rotor is provided with scrapers for trapping a viscous liquid existing on an inner wall of said inlet side end plate.

7. A device according to claim 6, wherein said end rotor has an end face arranged to face the inner wall of said inlet side end plate, and said scrapers are formed on the end face of said end rotor and point-symmetrically extend along a peripheral edge of said end face from central portions of opposing tip ends of said end face to the corresponding opposing tip ends of said end face in a rotational direction of said end rotor, while keeping a distance from the inner wall of said inlet side end plate.

8. A device according to claim 7, wherein the scrapers are spaced from the corresponding rotary shafts to provide a clearance for the flow of viscous liquid.

9. A device according to claim 1, wherein viscous liquid removing means is provided for removing a viscous liquid existing around said rotary shafts in said vessel.

10. A device according to claim 9, wherein said viscous liquid removing means comprises spiral grooves formed on portions of said rotary shafts, which extend outward from an interior of said vessel, to convey the viscous liquid by said spiral grooves.

11. A device according to claim 10, wherein said spiral grooves comprise first spiral grooves formed on the rotor side, and second spiral grooves formed outside of said first spiral grooves, and the spiral directions of said first spiral grooves are determined so that the viscous liquid in said vessel is extracted into said first spiral grooves, the spiral directions of said second spiral grooves being reverse to those of said first spiral grooves.

12. A device according to claim 11, wherein polymer is extracted from a position at which outer ends of said first spiral grooves meet inner ends of said second spiral grooves.

13. A device according to claim 1, wherein a vacuum suction apparatus is provided for maintaining an interior of said vessel at a vacuum pressure and has a bent port formed on an upper wall of said shell at an inlet side end portion of said vessel.

14. A device according to claim 13, wherein the bent port has an inner diameter which is 1.15 times or more larger than the maximum length of a portion of an outer edge of the rotor, which portion faces said bent portion.

15. A device according to claim 14, wherein each rotor has a rotor plate and a pair of scrapers which extend from opposing ends of said rotor plate in an axial direction of the rotor, and said outer edge of the rotor is that of said scraper.

16. A device according to claim 1, wherein viscous liquid moving means is provided at an outlet side end portion of said vessel for moving a viscous liquid toward an inner wall of said outlet side end plate.

17. A device according to claim 16, wherein said viscous liquid moving means comprises screws mounted on said first rotary shaft and said second rotary shaft.

18. A device according to claim 17, wherein each screw comprises a plurality of spaced rotor plates and each rotor plate is arranged to be rotated with respect to the adjacent rotor plate by a predetermined angle.

19. A device according to claim 18, wherein each rotor has opposing tin ends and peripheral outer walls which are twisted about an axis passing through the opposing tip ends of the rotor so that a twisting angle of said peripheral wall becomes large toward the opposing tip ends of the rotor, and the rotors of each rotary shaft are arranged to be relatively rotated so that the twisted opposing tip ends thereof are aligned with each other.

20. A device according to claim 19, wherein the twisting angles of the opposing tip ends of the rotors are about 65 degrees.

* * * * *